United States Patent [19]

Antonellis

[11] 4,354,791
[45] Oct. 19, 1982

[54] WHEELCHAIR CONSTRUCTION

[76] Inventor: Robert A. Antonellis, 2324 Garfield St., Hollywood, Fla. 33022

[21] Appl. No.: 53,319

[22] Filed: Jun. 29, 1979

[51] Int. Cl.³ .......................... B60N 1/08; A61G 5/00
[52] U.S. Cl. ............................ 414/343; 280/289 WC; 296/65 R; 414/401; 414/495; 414/584; 414/921; 297/DIG. 4
[58] Field of Search ............... 414/921, 401, 340, 343, 414/396, 498, 499, 500, 584, 495; 224/42.44, 42.43; 296/65 R, 20; 297/DIG. 4, 346, 347; 5/81 R; 280/242 WC, 289 WC; 248/429, 430, 424

[56] References Cited

U.S. PATENT DOCUMENTS

| | | | |
|---|---|---|---|
| 2,753,947 | 7/1956 | Mach | 296/65 R UX |
| 2,858,877 | 11/1958 | Krause | 296/65 R |
| 2,919,658 | 1/1960 | Kakoska | 414/537 X |
| 3,419,164 | 12/1968 | O'Neill | 296/65 R X |
| 3,758,894 | 9/1973 | Finley | 297/DIG. 4 |
| 3,905,436 | 9/1975 | Karchak et al. | 296/65 R X |
| 4,170,368 | 10/1979 | Southward et al. | 414/921 |

FOREIGN PATENT DOCUMENTS 2641005  3/1978  Fed. Rep. of Germany ...... 248/429

Primary Examiner—Robert J. Spar
Assistant Examiner—Jerold M. Forsberg
Attorney, Agent, or Firm—Charles E. Temko

[57] ABSTRACT

A wheelchair construction having means incorporated therein for the transfer of a seat element supporting an invalid from a wheeled frame to the seat of an automobile or other vehicle. The wheeled frame includes electrically or otherwise powered lifting means which in turn supports a platform mounting transversely extending tracks. The seat element is guided by the tracks for lateral movement. A similar set of tracks is carried by a platform supported upon an automobile seat, the tracks having extensions which in extended condition communicate with the tracks on the wheeled frame. The seat element with the invalid thereon is selectively transferred by first adjusting the level of the lifting means whereby the tracks on the frame are placed in coplanar relation relative to the tracks on the platform supported by the automobile seat. The track extensions are then placed in communication with both sets of tracks, and the seat element is released from retaining means holding the seat in fixed position, so that an attendant manually moves the seat element to the desired location. When the invalid has been transferred to the interior of the automobile, the frame element may be stored in the trunk thereof.

5 Claims, 5 Drawing Figures

WHEELCHAIR CONSTRUCTION

BACKGROUND OF THE INVENTION

This invention relates generally to the field of wheelchair construction, and other patient or invalid transfer equipment, and more particularly to an improved wheelchair and associated elements for transferring a supported invalid from the wheelchair to the interior of an automobile while in seated position.

While many young paraplegics are able to accomplish this transfer without assistance using a conventional folding wheelchair, and are able to subsequently fold and store the same, in the case of older or more feeble invalids, this can be accomplished only by physically lifting the invalid from the wheelchair and carrying him to the automobile seat. This operation usually requires the seating of the invalid on the automobile seat cushion facing an adjacent door opening, and subsequently turning him to face forwardly thereafter. Such maneuvers often require two attendants, particularly if the invalid is relatively heavy.

It is, of course, known in the art to modify a large sedan by fitting it with a ramp whereby a conventional wheelchair can be wheeled up the ramp into the area of the rear seat, and fasten the same in fixed position for subsequent travel. Such modifications are possible only in the case of very large automobiles, and are usually performed on an individual custom, and therefore expensive, basis.

SUMMARY OF THE INVENTION

Briefly stated, the invention contemplates the provision of an improved wheelchair construction having means for elevating a horizontal platform, the platform having track means for guiding a seat element supported thereon for sidewise movement onto a corresponding supporting means overlying and secured to an automobile seat. Means is provided for locking position of the seat element selectively in either position with the invalid aboard. A pair of pivotally mounted track extensions are normally in pendant position when not in use, and are raised to the plane of transfer to provide for bridging the gap which still remains after positioning the wheelchair as close to the vehicle as possible. The lifting means may be of an electrically operated type powered by interconnecting the same with the storage battery of the automobile. In the alternative, it may be manually powered, or operated by compressed air from a small storage tank which may be periodically recharged by a hand pump or at an automobile service station.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
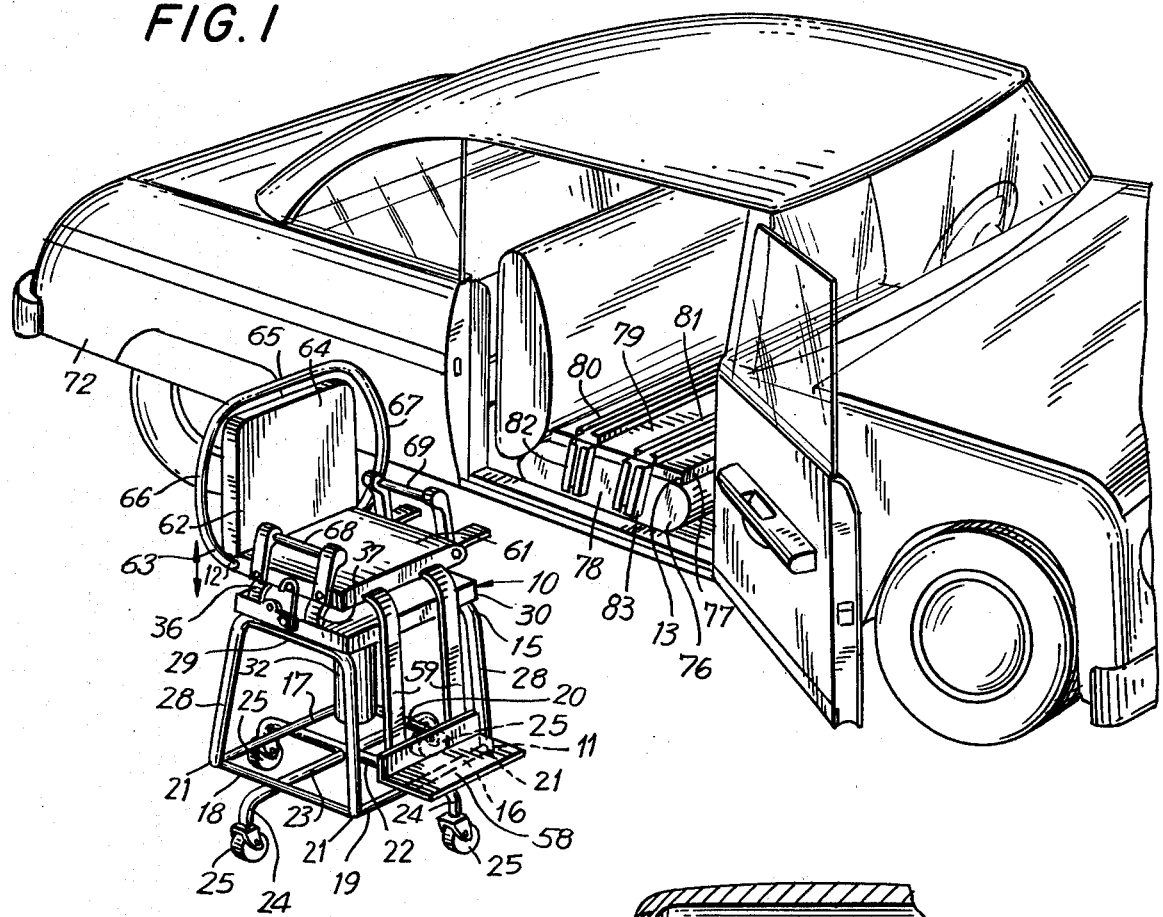
FIG. 1 is a fragmentary view in perspective of an embodiment of the invention.

In accordance with the invention, the device, generally indicated by reference character 10, comprises broadly a wheelchair base element 11, a moveable seat element 12, and an automobile supported seat element 13.

The base element 11 includes a frame element 15 forming a rectangular base 16, comprised of peripheral members 17, 18, 19 and 20. The members 17–20 are interconnected at corners 21 and support a pair of cruciform members 22 and 23, the downwardly extending ends 24 of which mount wheeled casters 25. Extending upwardly from the base 16 are vertical members 28 supporting horizontal members 29 by means of which a fixed horizontal platform 30 is supported.

Figure 2:
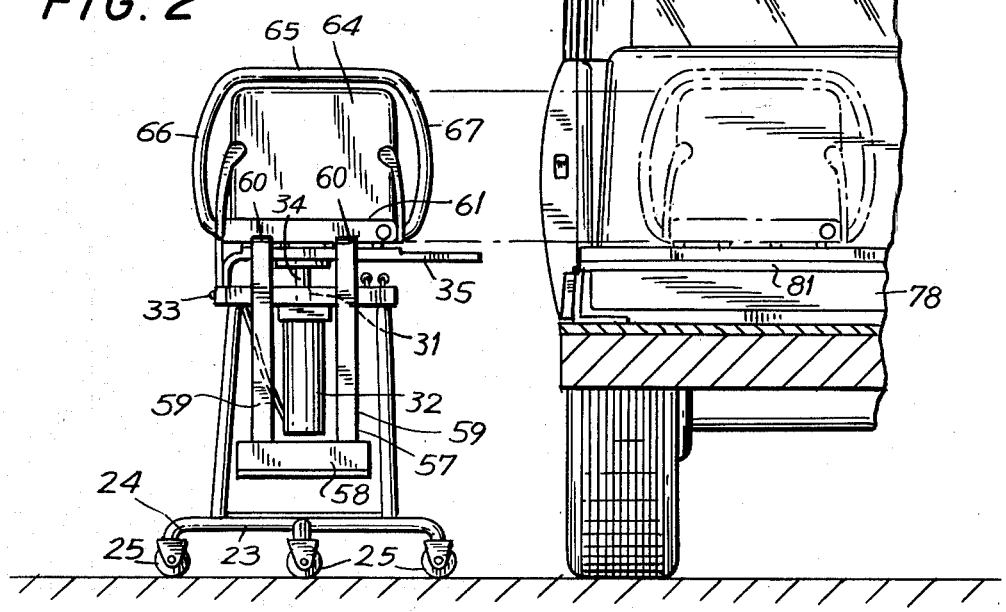
FIG. 2 is a fragmentary front elevational view thereof.
Figure 3:
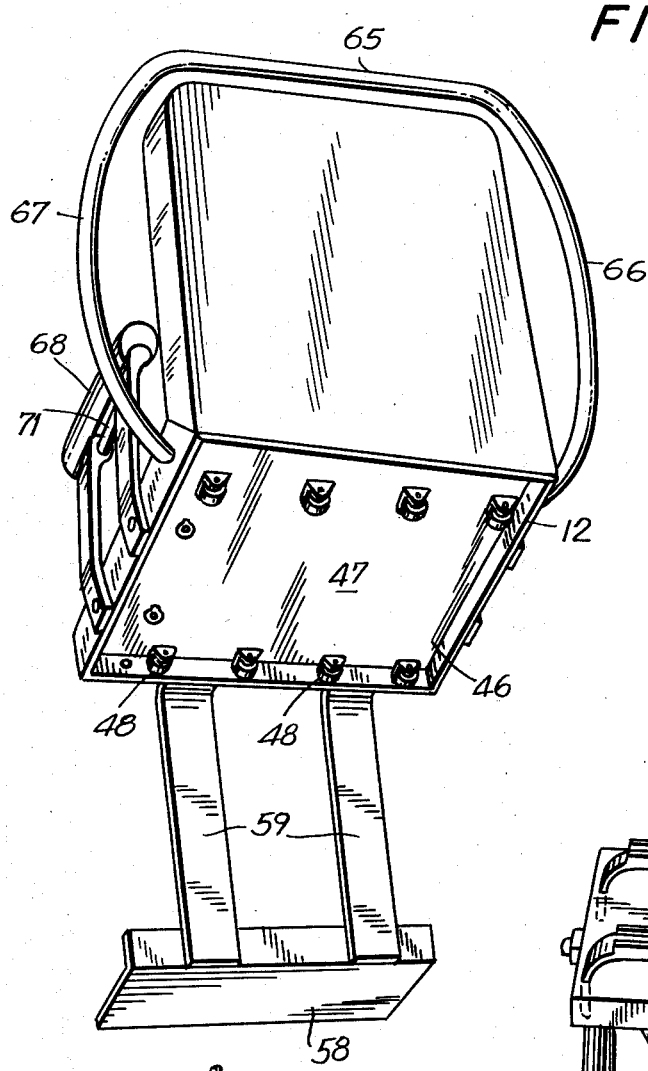
FIG. 3 is a bottom view in perspective of a seat element forming a part of the disclosed embodiment.
Figure 4:
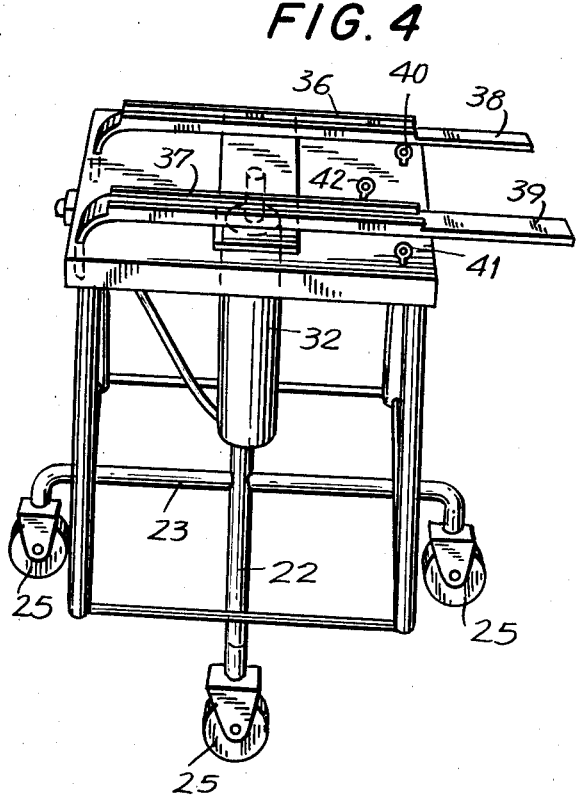
FIG. 4 is a top perspective view of a wheeled frame element forming another part of the embodiment.

The platform 30 has a central opening 31 supporting a lifting jack 32 controlled by push button switch means 33. The moving member 34 supports a second platform 35 which overlies the platform 30, an upper surface thereof being provided with first and second track members 36 and 37, respectively. (See FIG. 4.) The track members 36 and 37 are provided with lateral extensions 38 and 39, the purpose of which will more fully appear hereinafter. The upper surface of the platform 35 is provided with first and second screw eyes 40 and 41 which constitute part of a locking means, as well as a third screw eye 42 which prevents excessive leftward movement (as seen in FIG. 2) of the seat element upon the frame element.

Figure 5:
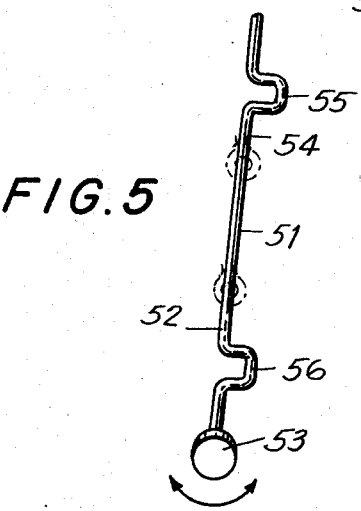
FIG. 5 is a view in perspective of means for locking the seat element in desired location.

The seat element 12 includes a rigid base 46, a lowered surface 47 of which mounts a plurality of casters 48 of a type which do not provide for rotation about a vertical axis. Also extending from this surface are fourth and fifth screw eyes 49 and 50, respectively, which pivotally mount a seat locking member 51 (FIG. 5). The member 51 includes an elongated shaft 52 having an operating knob 53 at one end thereof. A medial portion 54 is adapted to contact the screw eye 42 when the seat member is in its leftward most position (as seen in FIG. 2). A pair of offset portions 55 and 56 are adapted to clear the screw eyes 40 and 41, and with rotation to engage them to prevent rightward movement (again as seen in FIG. 2), thereby effectively locking the seat element in a horizontal plane upon the base element 11.

A detachable footrest 57 is also provided for use when the seat element is on the base element, its use normally not being required or desirable when the seat element is within a vehicle. It is preferably of lightweight construction including a platform 58 and supporting straps 59, the upper ends 60 of which are disposed beneath a seat cushion 61. A back rest 62 is mounted by an inverted U-shaped frame 63 which encloses a cushion 64. An upper horizontal rail 65 of the frame 63 is conveniently manually engagable by an attendant, and side rails 66 and 67 provide means for pushing the seat element laterally without disturbing the patient. Arm rests 68 and 69 include padded members 70 carried by a handle like support 71 which permits the seat element to be manually lifted by a pair of attendants, if necessary.

The automobile supported seat 13 includes a rigid platform 76 having strap means 77 for anchoring the same upon the seat cushion 78 of an automobile. The upper surface 79 thereof is provided with track members 80 and 81. Hingedly mounted extensions 82 and 83 are illustrated in FIG. 1 in pendant condition, and when elevated to horizontal position they communicate with the track members 80 and 81 and engage the extensions 38 and 39 to effectively lock the position of the base element 11 relative to the vehicle, generally indicated by reference character 72. Locking screw eyes corresponding to screw eyes 40–42, inclusive, may be provided and desired, but since the position of the invalid within the vehicle may be fixed by resort to safety belts normally present, this structure may be eliminated with a corresponding loss of function.

The operation of the device will be apparent from consideration of FIGS. 1 and 2. The wheelchair base element and supported seat element functions in the manner of a conventional wheelchair until transfer to a vehicle is desired. In this connection, larger wheels (not shown) may be provided in addition to the casters 25 for more convenient forward movement. For transfer to the vehicle, the wheelchair element is brought adjacent the door opening, and the seat element elevated to permit communication with the track members in the vehicle and on the base element. The seat element is then unlocked by rotating the knob 53, and the attendant moves the seat element and seated invalid directly into the interior of the vehicle. At this point, the base element may be stored in the vehicle trunk so as to be available at the next destination. The patient is unloaded by merely reversing this procedure.

I wish it to be understood that I do not consider the invention limited to the precise details of structure shown and set forth in this specification, for obvious modifications will occur to those skilled in the art to which the invention pertains.

I claim:

1. An improved wheelchair construction having seat transfer means cooperating with the seat of an adjacently positioned vehicle comprising: a wheeled base element having first guiding means thereon, a movable seat element selectively supported by said base element for controlled lateral movement thereupon, said base element having elevating means thereon for adjusting the vertical level of said seat element relative thereto; a platform adapted for support by an automobile seat cushion and having corresponding second guiding means thereon selectively communicating with said guiding means on said base element, whereby said seat element may be selectively moved between said base element and said platform to and from said vehicle, said first and second guiding means each having a set of tracks thereon, said seat element having wheeled means constrained by said tracks to permit only lateral movement; said second guiding means including a set of extendable track extensions interconnected to said platform and selectively engaging the tracks on said base element.

2. A wheelchair construction in accordance with claim 1, further characterized in said track extensions being hingedly connected to said platform, and disposed in pendent relation relative to an edge of said platform when not in use.

3. A wheelchair construction in accordance with claim 1, further comprising means for selectively locking said seat element against lateral movement upon either of said base element and platform.

4. A wheelchair construction in accordance with claim 1, in which said elevating means comprises an electrically powered jack interconnected with the storage battery of said vehicle.

5. A wheelchair in accordance with claim 1, in which said elevating means comprises a pneumatically powered cylinder.

* * * * *